United States Patent [19]
Glass et al.

[11] Patent Number: 5,865,264
[45] Date of Patent: Feb. 2, 1999

[54] TRACTOR HAVING A CAB RISER BRACKET ASSEMBLY AND AN ASSOCIATED METHOD OF MOUNTING THE BRACKET ASSEMBLY ON THE TRACTOR

[75] Inventors: Manfred Glass, Sandelzhausen; Viktor Richtsfeld, Mainburg; Josef Schmidbauer, Bruckberg; Klaus Ukens, Haag/A, all of Germany

[73] Assignee: Caterpillar Inc., Peoria, Ill.

[21] Appl. No.: 697,944

[22] Filed: Sep. 3, 1996

[51] Int. Cl.⁶ .................................................. B62D 33/06
[52] U.S. Cl. ..................................... 180/89.13; 180/89.14; 180/89.15
[58] Field of Search .............................. 180/89.13, 89.14, 180/89.15

[56] References Cited

U.S. PATENT DOCUMENTS 3,891,264  6/1975  Hunter, II et al. .................... 180/89.13
3,957,165  5/1976  Smith .................................... 180/89.13

*Primary Examiner*—J. Woodrow Eldred
*Attorney, Agent, or Firm*—Maginot, Addison & Moore

[57] ABSTRACT

The tractor includes a frame member mounted in the tractor body and a first mounting member secured to the frame member, the first mounting member including a plurality of first apertures. The tractor also includes a bracket for supporting a cab riser apparatus thereon, the cab riser apparatus being capable of moving the tractor cab relative to the tractor body. The tractor further includes a second mounting member secured to the bracket. The second mounting member including a plurality of second apertures which align with the plurality of first apertures. A method of mounting a bracket onto a frame member of a tractor body is also disclosed.

11 Claims, 7 Drawing Sheets

Fig_2_

Fig_3_

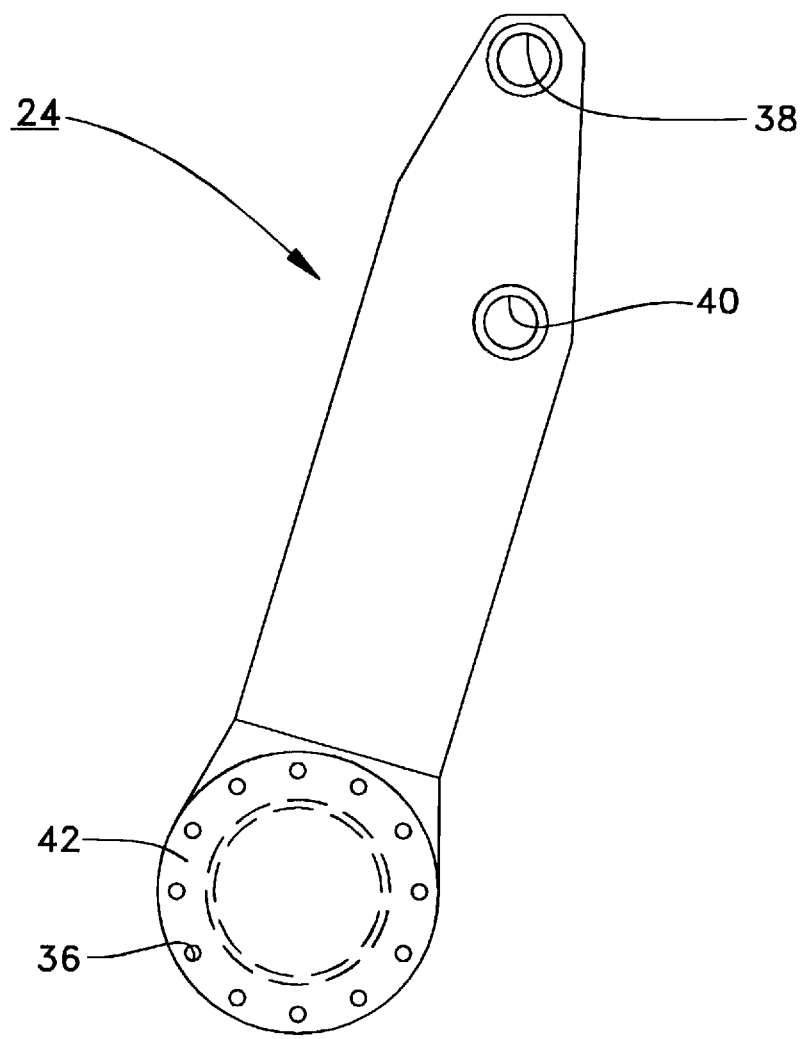
Fig_5_

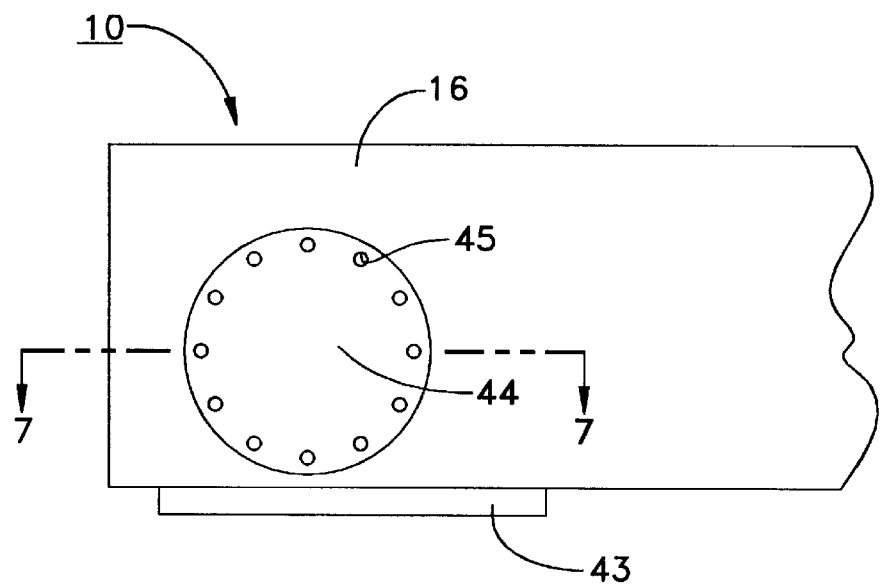
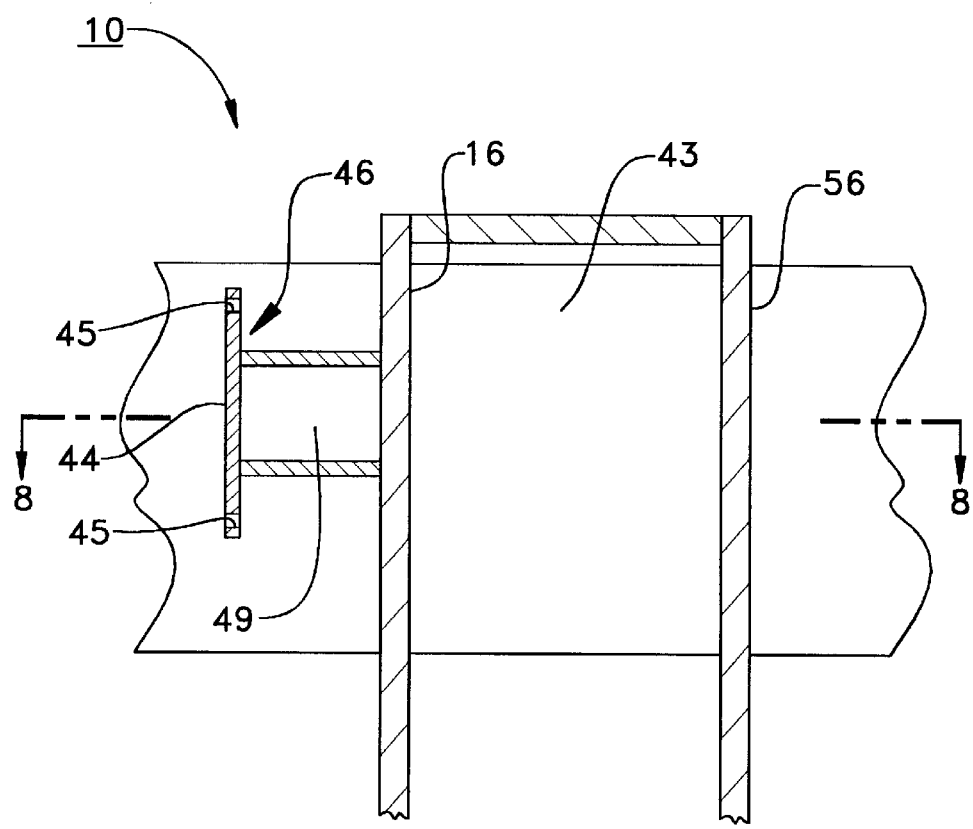

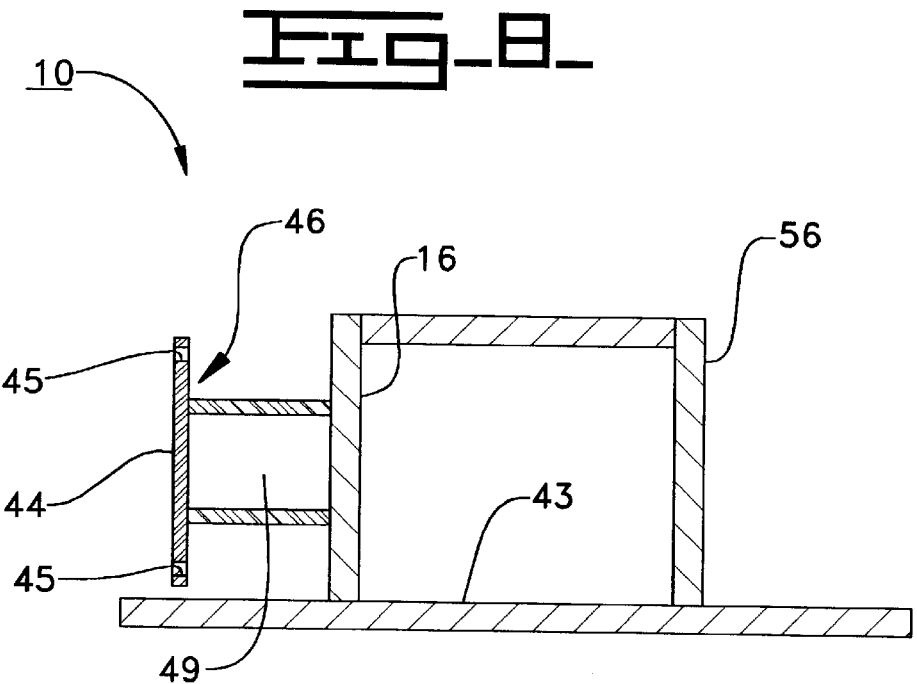
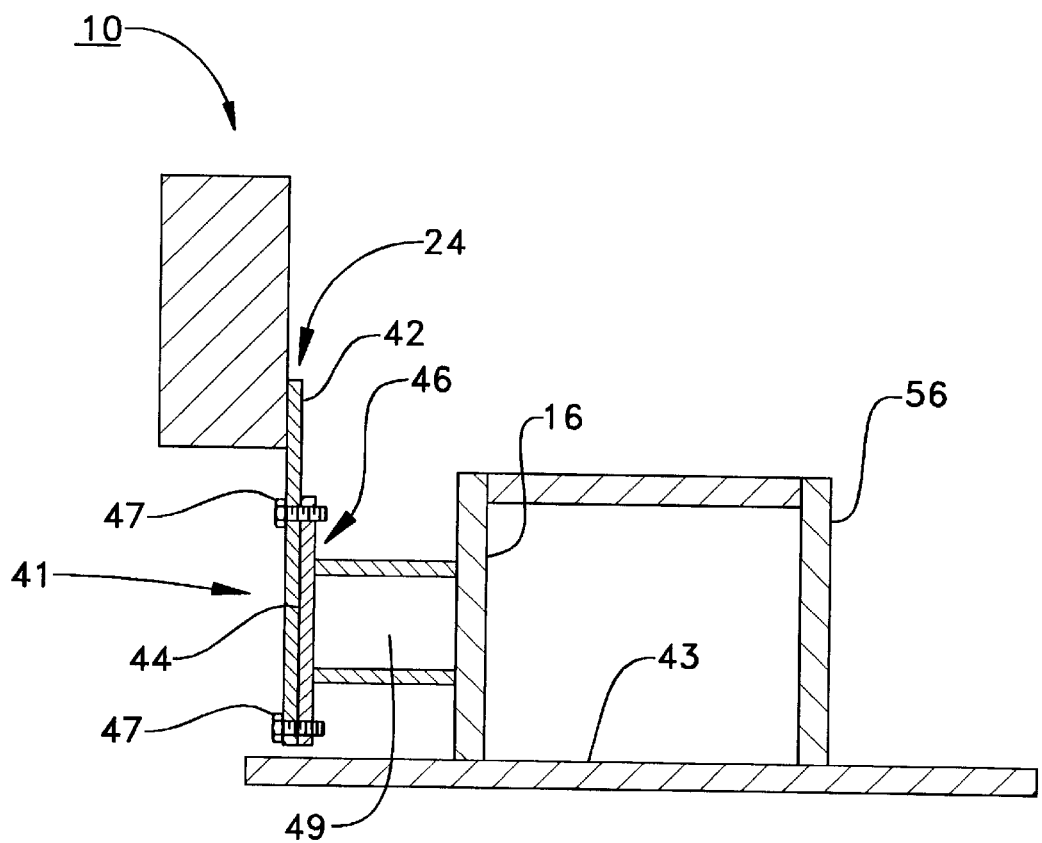

TRACTOR HAVING A CAB RISER BRACKET ASSEMBLY AND AN ASSOCIATED METHOD OF MOUNTING THE BRACKET ASSEMBLY ON THE TRACTOR

BACKGROUND OF THE INVENTION

The present invention generally relates to a tractor having a cab riser bracket assembly and an associated method of mounting the bracket assembly on the tractor.

Material handling machines, such as grapple tractors (hereinafter referred to as tractors), are typically used in projects which require the movement of significant amounts of scrap, such as ferrous materials. These types of tractors generally include a grapple or magnet operatively linked to a boom and arm. Hereinafter, the boom and arm is collectively referred to as the grapple arm. The primary function of the grapple arm is to move the grapple in such a manner that it can grasp and transfer the scrap from one location to another. These types of tractors also include a cab that houses the operator and the controls used to direct the movements of the grapple arm, and therefore the grapple.

These tractors are often used to load or unload scrap from truck beds or from barges. However, using such tractors to perform the aforementioned loading or unloading function has a significant drawback. That is, it is very difficult for the operator of the tractor to see down into the truck bed or barge from his or her position in the cab. The operator's inability to see down into the truck bead or barge impedes his or her ability to properly control the movement of the grapple arm and grapple. As a result, the operator's ability to efficiently operate the grapple arm and grapple decreases.

In order to overcome the above described problem, several tractor models are constructed to include an adjustable cab riser apparatus. Such an apparatus allows the operator of the tractor to raise the cab to the desired height above the tractor body. Having the cab positioned at an appropriate height above the tractor body allows the operator to see into the truck bed, barge or container being loaded or unloaded, and therefore facilitates the proper control of the grapple arm and grapple.

Some cab riser apparatus are constructed to include a large unitary bracket member directly welded onto the frame of the tractor body. These apparatus also include a hydraulic cylinder and a number of support arms. The hydraulic cylinder and support arms are connected to the bracket member and a brace. The brace is connected to a platform member for supporting the tractor cab. Generally, the aforementioned cab riser components are arranged such that the actuation and extension of the hydraulic cylinder causes the brace, platform member, and therefore the tractor cab, to rise above the tractor body to a desired height. However, as will be discussed below, present cab riser apparatus suffer from several drawbacks.

One problem with the above described arrangement is that the large unitary bracket used to mount the above described components is difficult to fabricate and handle during the construction of the cab rising apparatus. For example, fabricating a large component is more complex and costly than fabricating two smaller components. Moreover, once the large unitary bracket used by the prior art is welded onto the tractor body, the body becomes more difficult to handle. For instance, the body becomes cumbersome to move from one location to another within the manufacturing facility.

Another problem with certain types of brackets used to mount cab rising apparatus relates to the ease in which they can be mounted onto a tractor body. As discussed above, many prior art brackets are directly welded onto the tractor body. Since these brackets are typically large and cumbersome, the welding process is difficult. Furthermore, once the bracket is welded onto the body, the bracket's spatial relationship to the body is fixed. Therefore, no convenient adjustment of the bracket's position relative to the body is possible. This is a significant drawback since, in many cases, adjustment of the bracket is required for the cab riser apparatus to work properly.

Additional problems with prior art cab riser apparatus include (1) their inability to be retrofit onto tractor bodies; (2) they are relatively bulky, and thus require a significant amount of space; and (3) they tend to be relatively unstable in the raised position and thus cause the cab to "wobble" or move around during use of the tractor.

Therefore, in light of the above discussion, it is apparent that a bracket assembly for mounting a cab rising apparatus which is easy to manufacture and handle is desirable. The present invention provides such a bracket assembly. The bracket assembly of the present invention includes a relatively small weld group welded onto the frame of the tractor body. The bracket of the bracket assembly is then bolted onto the weld group, rather than being welded directly to the frame.

In use, the present invention provides a bracket assembly which is relatively easy to fabricate and handle during the construction of a cab rising apparatus. Moreover, the present invention provides a bracket assembly which allows the position of the bracket to be adjusted after mounting. In addition, the present invention provides a bracket assembly that can be retrofit onto tractor bodies.

SUMMARY OF THE INVENTION

In accordance with one embodiment of the present invention, there is provided a tractor having a tractor cab which is movable relative to a tractor body. The tractor includes a frame member mounted in the tractor body and a first mounting member secured to the frame member, the first mounting member including a plurality of first apertures. The tractor also includes a bracket for supporting a cab riser apparatus thereon, the cab riser apparatus being capable of moving the tractor cab relative to the tractor body. The tractor further includes a second mounting member secured to the bracket. The second mounting member including a plurality of second apertures which align with the plurality of first apertures.

Pursuant to another embodiment of the present invention there is provided a tractor having a tractor cab which is movable relative to a tractor body. The tractor includes a frame member mounted in the tractor body and a first mounting member secured to the frame member. The tractor also includes a bracket for supporting a cab riser apparatus thereon, the cab riser apparatus being capable of moving the tractor cab relative to the tractor body. The tractor further includes a second mounting member secured to the bracket and a mechanism for securing the first mounting member to the second mounting member.

Pursuant to still another embodiment of the present invention there is provided a method of mounting a bracket onto a frame member of a tractor body, with the bracket being used to support a cab riser apparatus thereon. The cab riser apparatus being capable of moving a tractor cab relative to the tractor body. The method includes the following steps: (1) attaching a first mounting member to the frame member; (2) attaching a second mounting member to the bracket; (3) securing the first mounting member to the second mounting member at a first orientation; (4) separating the first mounting member from the second mounting member after the securing step; and (5) re-securing the first mounting member to the second mounting member at a second orientation which is different from the first orientation.

It is therefore an object of the present invention to provide a new and useful tractor having a cab riser bracket assembly.

It is another object of the present invention to provide an improved tractor having a cab riser bracket assembly.

It is yet another object of the present invention to provide a new and useful method of mounting a bracket assembly on the tractor.

It is still another object of the present invention to provide an improved method of mounting a bracket assembly on the tractor.

It is still another object of the present invention to provide a cab riser bracket assembly and frame member which is easy to fabricate and handle during the construction of the tractor.

It is moreover an object of the present invention to provide a cab riser bracket assembly which allows the position of the bracket to be adjusted after mounting onto a frame member of a tractor body.

It is still another object of the present invention to provide a cab riser bracket assembly that includes a bracket which can be retrofit onto a frame member of the tractor.

The above and other objects, features, and advantages of the present invention will become apparent from the following description and attached drawings.

BRIEF DESCRIPTION OF THE DRAWINGS

FIG. 5 is a side elevational view of a bracket member of the tractor cab rising apparatus of FIG. 3;

FIG. 6 is a side elevational view of a frame member of the tractor of FIGS. 1 and 2;

FIG. 7 is a cross sectional view taken along the line 7—7 of FIG. 6;

FIG. 8 is a cross sectional view taken along the line 8—8 of FIG. 7;

FIG. 9 is a cross sectional view similar to FIG. 8 which shows the relationship between the frame member of FIG. 8 and the bracket member of FIG. 5.

DETAILED DESCRIPTION OF THE PREFERRED EMBODIMENT

Figure 1:
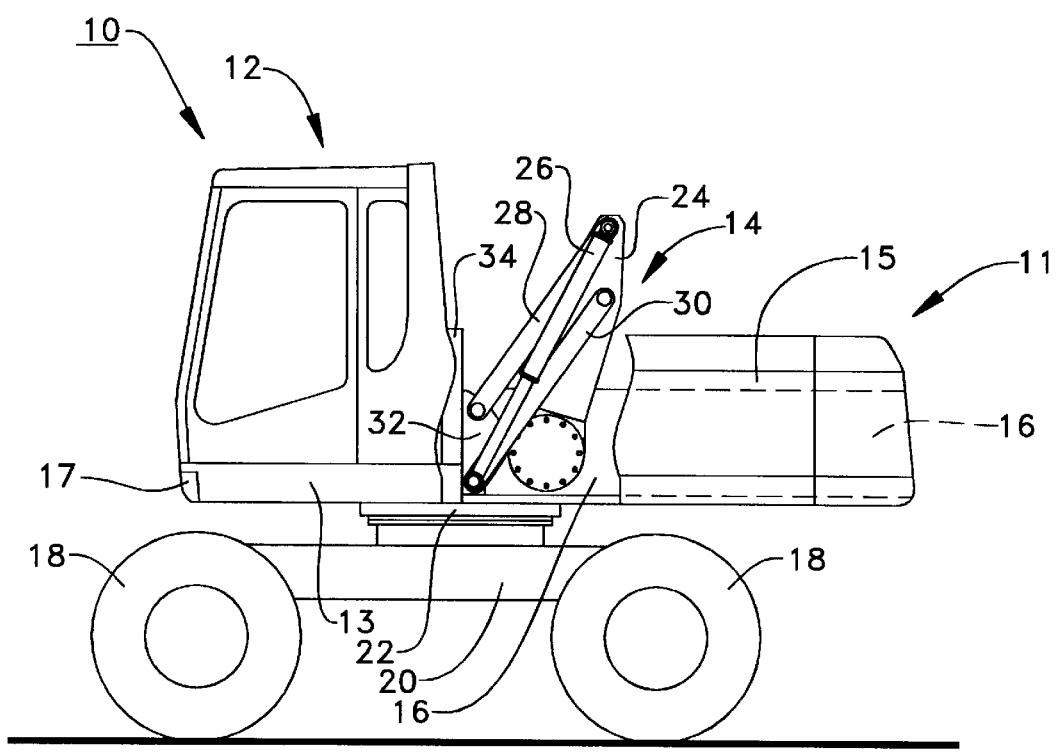
FIG. 1 is a side elevational view of a tractor having a tractor cab located at a first position relative to a tractor body which incorporates the features of the present invention therein.

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Figure 2:
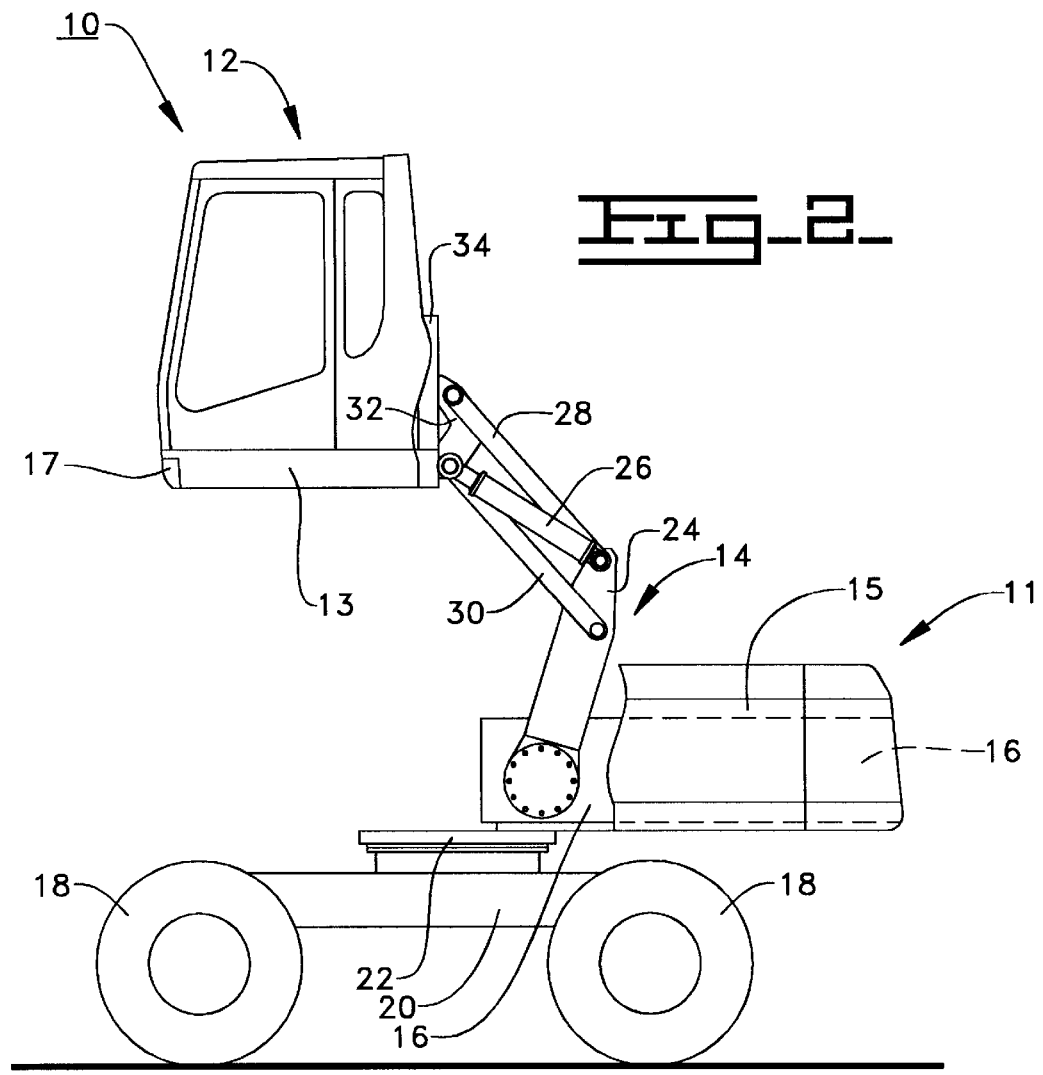
FIG. 2 is a side elevational view of the tractor of FIG. 1, with the tractor cab located at a second position relative to the tractor body.

Referring now to FIGS. 1 and 2, there is shown a tractor 10 with its grapple arm removed for clarity of description. The tractor 10 includes a body 11, a cab 12, a cab rising apparatus 14, a chassis 20, and a number of wheels 18. A pedestal member 22 is disposed on the chassis 20, and supports the cab 12 and the body 11.

The tractor 10 is shown with the cab 12 in a normal position in FIG. 1. More specifically, the cab 12 is in a normal position when it has not been raised relative to the body 11. In FIG. 2, the tractor 10 is shown with the cab 12 in a raised position. More specifically, the cab 12 is shown spaced apart from the body 11 at a location above the body 11.

The cab 12 defines a housing in which an operator of the tractor 10 sits. The cab 12 includes a substantially planar platform member 13 and is fastened thereto. The platform member 13 includes a support member 34. The support member 34 has a brace 32 mounted thereto. The brace 32 couples the cab 12 to the cab rising apparatus 14 as shall be described in more detail below.

The cab 12 further includes a light assembly 17. The light assembly 17 includes a known headlight and a known turn signal, thereby allowing the tractor 10 to be operated legally on a public street in some countries, if necessary.

A portion of a body panel 15 has been removed from the body 11 in FIGS. 1 and 2 in order to more clearly show the cab rising apparatus 14. The cab rising apparatus 14 includes a bracket member 24, a pair of support arms 28, 30, and a hydraulic cylinder 26.

A frame member 16 is horizontally disposed along the lower edge of the body 11 as shown in FIGS. 1 and 2. As shall be discussed in detail below, the bracket member 24 is connected to the frame member 16 in order to couple the cab 12 to the body 11.

Figure 3:
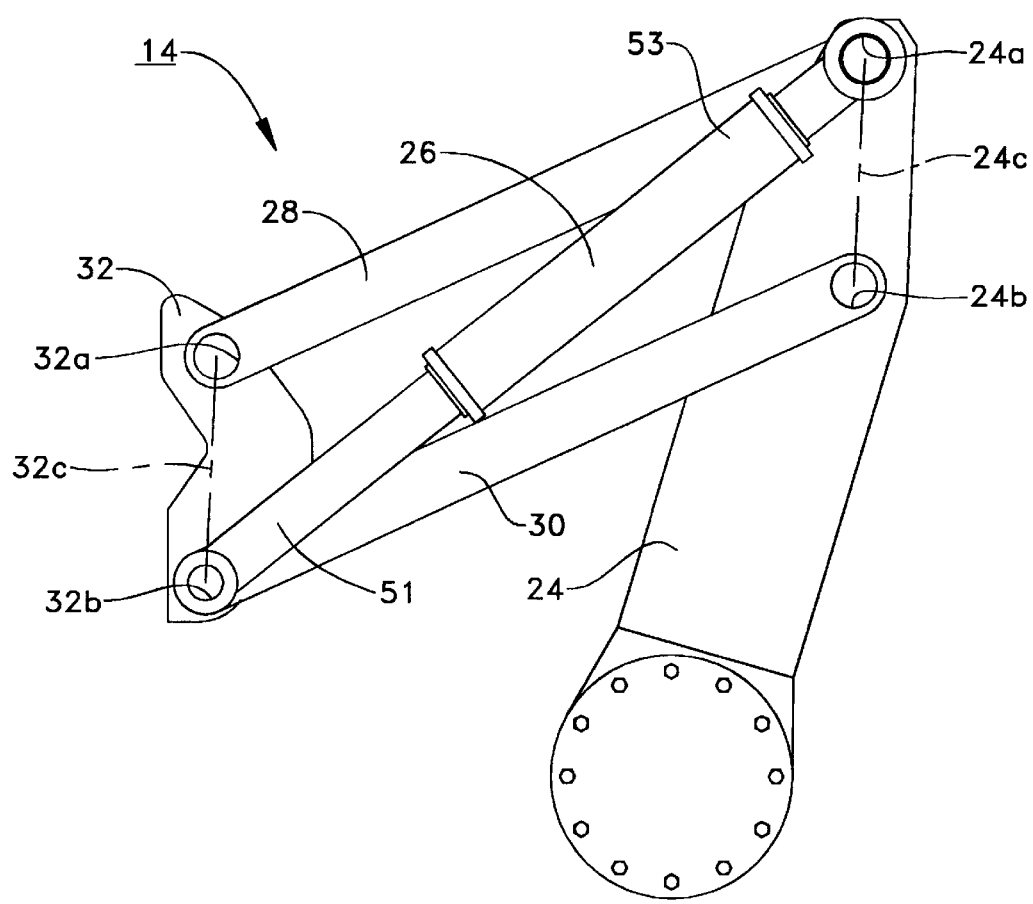
FIG. 3 is a fragmentary side elevational view of a tractor cab rising apparatus which is utilized in the tractor of FIGS. 1 and 2.

Referring now to FIG. 3, the cab riser apparatus 14 is shown in more detail. In particular, the support arm 28 is pivotally coupled at a first end to the bracket member 24 by a pin joint 24a, and at a second end to the brace 32 by a pin joint 32a. Similarly, the support arm 30 is pivotally coupled at a first end to the bracket member 24 by a pin joint 24b, and at a second end to the brace 32 by a pin joint 32b.

The pin joint 32a is arranged above the pin joint 32b as shown in FIG. 3. A dashed line 32c connects the center points of the pin joints 32a and 32b, and is provided for illustrative purposes. Likewise, the pin joint 24a is arranged above the pin joint 24b as shown in FIG. 3. A dashed line 24c connects the center points of the pin joints 24a and 24b, and is provided for illustrative purposes.

The cab riser apparatus 14 is a parallel linkage apparatus. That is, the support arms 28 and 30 and the lines 24c and 32c form a parallelogram. In this arrangement, support arms 28 and 30 will always be parallel to one another. Likewise, the lines 24c and 32c will always be parallel to one another. The line 32c is perpendicular to the platform member 13, as shown in FIGS. 1 and 2. Therefore, as shown in FIGS. 1 and 2, the platform member 13 remains substantially horizontal relative to the frame member 16 as the cab 12 is raised up and lowered down.

The cab rising apparatus 14 is relatively compact. More specifically, as shown in FIGS. 1 and 2, the cab rising apparatus does not utilize a significant portion of the overall length of the tractor 10. This feature is particularly useful in that more usable area of the tractor 10 is available for other components, e.g. the engine, than is available in tractors which contain cab rising apparatus which are not as compact.

The hydraulic cylinder 26 is used in the cab riser apparatus 14 in order to raise the cab 12. The hydraulic cylinder is shown in more detail in FIG. 4. The hydraulic cylinder 26 includes a head end 26a and a rod end 26b. Moreover, the hydraulic cylinder 26 includes a piston 50, a rod 51, and a housing 53. A hole 54 is defined in the housing 53 such that the head end 26a may be connected to the pin joint 24a as shown in FIG. 3. Moreover, a hole 48 is defined in a first end of the rod 51 as shown in FIG. 4 such that the rod end 26b may be connected to the pin joint 32b as shown in FIG. 3.

The rod 51 is connected at a second end to the piston 50. The hydraulic cylinder 26 includes a first fluid area 52 and a second fluid area 55 which each contain a volume of a hydraulic fluid (not shown) therein. Moreover, a pair of couplings 58 and 62 are defined in the housing 53. The couplings 58 and 62 are connected to a fluid pump and reservoir (not shown) via a pair of fluid lines 60 and 64, respectively, in order to provide for the flow of hydraulic fluid into and out of the fluid areas 52 and 55, respectively.

In order to raise the cab 12 (FIGS. 1 and 2), hydraulic fluid is pumped under pressure into the fluid area 52 via the fluid line 60, thereby exerting a force on a rod-side surface 50b, i.e. the side corresponding to the rod end 26b, of the piston 50.

Figure 4:
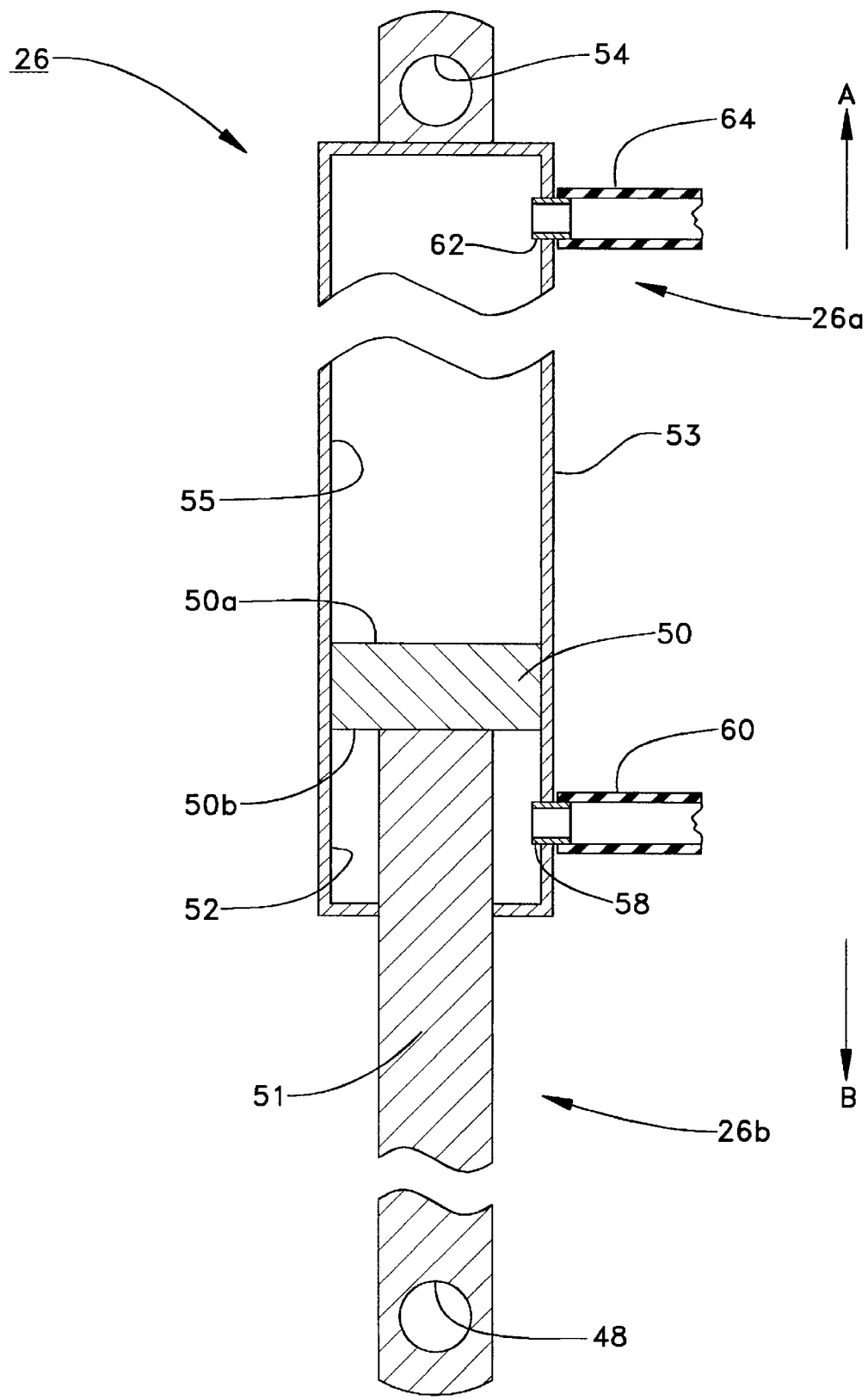
FIG. 4 is a cross sectional view of a hydraulic cylinder of the tractor cab rising apparatus of FIG. 3.

When the force applied to the rod-side surface 50b is sufficient in magnitude, the piston 50, and therefore the rod 51, is urged in the general direction of the arrow A of FIG. 4. As the piston 50 moves in the general direction of the arrow A, the rod 51 is retracted into the housing 53.

In order to lower the cab 12, hydraulic fluid is pumped under pressure into the fluid area 55 via the fluid line 64, thereby exerting a force on a head-side surface 50a, i.e. the side corresponding to the head end 26a, of the piston 50. When the force applied to the head-side surface 50a is sufficient in magnitude, the piston 50, and therefore the rod 51, is urged in the general direction of the arrow B of FIG. 4, thereby causing the rod 51 to protrude more fully from the housing 53, and thus lowering the cab 12 to its normal position as shown in FIG. 1.

Therefore, when the cab riser apparatus 14 is in its normal (i.e. lowered) position, as shown in FIG. 1, the hydraulic cylinder 26 is at a maximum extension. More specifically, the rod 51 is fully protruding from the housing 53. However, when the cab riser apparatus 14 is in the raised position, as in FIG. 2, the hydraulic cylinder 26 is at a minimum extension. More specifically, the rod 51 is fully retracted into the housing 53.

The aforementioned configuration, wherein the hydraulic cylinder 26 is in a retracted position when the cab 12 is in a raised position, enhances the stability of cab riser apparatus 14. In particular, the cab 12, while in the raised position, is less likely to move or "wobble" due to forces encountered during the use of the tractor 10.

Furthermore, it should be appreciated that additional hydraulic cylinders may be added to the cab riser apparatus 14. In particular, a second hydraulic cylinder could be connected to the bracket member 24 in the same configuration as the hydraulic cylinder 26, i.e. the second hydraulic cylinder is in a retracted position when the cab 12 is in a raised position. However, the second hydraulic cylinder may be located on the side of the bracket 24 opposite the hydraulic cylinder 26. The addition of the second hydraulic cylinder may increase the amount of lifting force generated by the cab rising apparatus 14.

Referring now to FIG. 5, there is shown the bracket member 24 of the cab riser apparatus 14 with the support arms 28, 30 and the hydraulic cylinder 26 removed therefrom. The bracket member 24 has a pair of holes 38 and 40 defined therein. The hole 38 accommodates the pin joint 24a of FIG. 3, whereas the hole 40 accommodates the pin joint 24b of FIG. 3.

The bracket member 24 further includes a flange 42. The flange 42 may be integrated into the bracket member 24, or it may be a separate component mechanically fastened, i.e. welded, to the bracket member 24. The flange 42 has a plurality of holes 36 defined therein. The holes 36 are used to bolt, or similarly fasten, the bracket member 24, and therefore the cab 12 via the support arms 28, 30, to the frame member 16 of FIGS. 1 and 2.

Providing a bracket member 24 which is separate from the frame member 16 prior to final assembly simplifies the manufacturing process of the tractor 10. In particular, it is simpler to fabricate a separate frame member 16, and subsequently bolt the bracket member 24 thereto, then it is to fabricate a frame member 16 with an integrated bracket member 24. Moreover, as shall be discussed in more detail below, the use of a separate, discrete bracket member 24 allows manufacturing flexibility in that a common frame member 16 can be used, with only minor modifications thereof needed, in both a tractor which includes an optional cab rising feature, and a tractor which does not include such a feature.

Referring now to FIG. 6, there is shown a fragmentary side elevational view of the tractor 10. In particular, there is shown the frame member 16. Connected to the frame member 16 is a mating flange 44. The mating flange 44 is substantially similar to the flange 42 of the bracket member 24 of FIG. 5. The mating flange 44 has a plurality of holes 45 defined therein. The holes 45 receive bolts, or similar fasteners, in order to couple the flange 42 to the mating flange 44. The mating flange 44 is positioned adjacent to a frame support member 43 as shown in FIG. 6. The mating flange 44 is welded to the frame support member 43 and the frame member 16 as discussed below.

FIG. 7 is a cross sectional view taken along the lines 7—7 of FIG. 6 as viewed in the direction of the arrows. Moreover, FIG. 8 is a cross sectional view taken along the lines 8—8 of FIG. 7 as viewed in the direction of the arrows.

FIGS. 7 and 8 show the frame support member 43 which couples the frame member 16 (shown in FIGS. 1 and 2) to a second frame member 56. The frame member 56 is identical to the frame member 16 and is disposed parallel thereto, thereby cooperating with the frame member 16 and the frame support member 43 to form the main supporting elements of the body 11 and the grapple arm (not shown).

The mating flange 44 is secured to the frame support member 43. Moreover, the mating flange 44 is secured to the frame member 16 by a mating flange support member 49. The mating flange support member is cylindrical in shape, and is welded at a first end to the frame member 16, and at a second end to the mating flange 44.

Collectively, the mating flange 44 and the mating flange support member 49 form a weld group 46. As shown in FIG. 8, the weld group 46 is welded to both the frame member 16 and the frame support member 43. This welding configuration provides the structural strength necessary to support the cab riser apparatus 14 and the cab 12 during the use of the tractor 10.

Referring now to FIG. 9, there is shown a cross sectional view similar to FIG. 8, but also including the bracket member 24. The flange 42 of the bracket member 24 is coupled to the weld group 46 with a plurality of bolts 47. The bolts 47 are received into the holes 36 of the flange 42 (FIG. 5) and are secured into the holes 45 of the mating flange 44 (FIG. 6). Collectively, the bracket member 24, the flange 42, the bolts 47, and the weld group 46 form a bracket assembly 41 as shown in FIG. 9.

The fabrication of the tractor 10 is simplified by the use of separate, discrete components. In particular, the frames 16, 56 and the frame support member 43 are of a configuration commonly used on other current tractor designs. A sub-assembly is formed by welding the mating flange 44 to the mating flange support member 49 to create the weld group 46, as described above. Thereafter, the weld group 46 is welded to the frame member 16 and the frame support member 43 as shown in FIGS. 6–9.

Subsequently, during a final assembly process, the bracket member 24 is fastened to the weld group 46 as shown in FIG. 9. Thereafter, the remaining components of the cab riser apparatus 14, i.e. the support arms 28, 30 and the hydraulic cylinder 26, are coupled to the bracket member 24 and the brace 32 (see FIG. 3).

The aforementioned fabrication process reduces the cost associated with the construction of the tractor 10. In particular, a separate frame member 16, with the bracket member 24 integrated therein, does not need to be designed, but rather the same frame member 16 can be used in tractors which contain a cab riser apparatus, and those tractors which do not contain such apparatus.

Moreover, the use of a separate, discrete bracket member 24 enhances the material handling flow during the tractor manufacturing process. In particular, a frame with an integrated bracket member, is more difficult and cumbersome to move throughout the manufacturing plant than is the frame member 16 of the present invention, wherein only the welding group 46 is attached to the frame member 16 prior to final assembly.

Further, the angle of the bracket member 24 relative to the frame member 16 may be altered to facilitate the proper operation of the cab rising apparatus 14. In particular, the bolts 47 (FIG. 9) can be removed from the flange 42, thereby allowing the bracket member 24 to be lifted away from the mating flange 44. The flange 42 may then be rotated in either a clockwise or counter-clockwise direction in increments defined by the locations wherein the holes 36 and the holes 45 align. Thereafter, the bolts 47 may be reinstalled, as shown in FIG. 9. On the contrary, the angle of the bracket member relative to the frame may not be adjusted easily on known tractor designs wherein the bracket member is integrated in the frame.

While the invention has been illustrated and described in detail in the drawings and foregoing description, such illustration and description is to be considered as exemplary and not restrictive in character, it being understood that only the preferred embodiments have been shown and described and that all changes and modifications that come within the spirit of the invention are desired to be protected.

What is claimed is:

1. A tractor having a tractor cab which is movable relative to a tractor body, comprising:

a frame member mounted in said tractor body;

a first mounting member secured to said frame member, said first mounting member including a plurality of first apertures;

a bracket for supporting a cab riser apparatus thereon, said cab riser apparatus being capable of moving said tractor cab relative to said tractor body; and a second mounting member secured to said bracket, said second mounting member including a plurality of second apertures which align with said plurality of first apertures, wherein (i) said first mounting member includes a first disk having a substantially circular shape, containing said plurality of first apertures and (ii) said second mounting member includes a second disk having a substantially circular shape containing said plurality of second apertures.

2. The tractor of claim 1, further comprising a plurality of bolts which are positionable within said plurality of first apertures and said plurality of second apertures.

3. The tractor of claim 1, wherein:

said bracket includes a first end and a second end, said first end of said bracket is secured to said cab riser apparatus, and said second end of said bracket is secured to said second mounting member.

4. The tractor of claim 1, wherein said first mounting member is spaced apart from said frame member by a support member.

5. A tractor having a tractor cab which is movable relative to a tractor body, comprising:

a frame member mounted in said tractor body;

a first mounting member secured to said frame member;

a bracket for supporting a cab riser apparatus thereon, said cab riser apparatus being capable of moving said tractor cab relative to said tractor body;

a second mounting member secured to said bracket; and means for securing said first mounting member to said second mounting member, wherein (i) said first mounting member includes a first disk having a substantially circular shape, containing said plurality of first apertures and (ii) said second mounting member includes a second disk having a substantially circular shape containing said plurality of second apertures.

6. The apparatus of claim 5, wherein said securing means includes:

a plurality of first apertures defined in said first mounting member, a plurality of second apertures defined in said second mounting member, and a plurality of bolts which are positionable within said plurality of first apertures and said plurality of second apertures.

7. The tractor of claim 5, wherein:

said bracket includes a first end and a second end, said first end of said bracket is secured to said cab riser apparatus, and said second end of said bracket is secured to said second mounting member.

8. The tractor of claim 5, wherein said first mounting member is spaced apart from said frame member by a support member.

9. A method of mounting a bracket onto a frame member of a tractor body, with the bracket being used to support a cab riser apparatus thereon, and further with the cab riser apparatus being capable of moving a tractor cab relative to the tractor body, comprising the steps of:

attaching a first mounting member to the frame member;

attaching a second mounting member to the bracket;

securing the first mounting member to the second mounting member at a first orientation;

separating the first mounting member from the second mounting member after the securing step; and re-securing the first mounting member to the second mounting member at a second orientation which is different from the first orientation.

10. The method of claim 9, wherein the securing step includes the step of bolting the first mounting member to the second mounting member.

11. The method of claim 10, wherein:

the first mounting member has a plurality of first apertures defined therein and the second mounting member has a plurality of second apertures therein, and the bolting step includes the step of securing a plurality of bolts in the plurality of first apertures and the plurality of second apertures.

* * * * *